United States Patent [19]

Uemura et al.

[11] Patent Number: 5,010,634

[45] Date of Patent: Apr. 30, 1991

[54] VEHICLE ASSEMBLY METHOD AND APPARATUS

[75] Inventors: Satoshi Uemura, Tokyo; Susumu Kawada, Kamakura; Yoshitada Sekine, Yokohama; Tatsuo Miyauchi, Utsunomiya, all of Japan

[73] Assignee: Nissan Motor Company, Ltd., Yokohama, Japan

[21] Appl. No.: 282,189

[22] Filed: Dec. 9, 1988

[30] Foreign Application Priority Data

Dec. 10, 1987 [JP] Japan .................... 62-313024

[51] Int. Cl.$^5$ ........................... B23P 21/00
[52] U.S. Cl. ........................ 29/407; 29/430; 29/712; 29/714; 29/720
[58] Field of Search ............... 29/407, 430, 712, 714, 29/720; 901/7, 9

[56] References Cited

U.S. PATENT DOCUMENTS

| | | | |
|---|---|---|---|
| 4,589,184 | 5/1986 | Asano et al. | 29/712 |
| 4,589,199 | 5/1986 | Ohtaki et al. | 29/712 |
| 4,654,949 | 4/1987 | Pryor | 29/702 |
| 4,691,905 | 9/1987 | Tamura et al. | 29/281.5 |
| 4,736,515 | 4/1988 | Catena | 29/714 |
| 4,757,608 | 7/1988 | Ouhi | 29/703 |
| 4,852,237 | 8/1989 | Tradt et al. | 29/712 |

FOREIGN PATENT DOCUMENTS

| | | |
|---|---|---|
| 0147530 | 7/1985 | European Pat. Off. |
| 0232999 | 1/1987 | European Pat. Off. |
| 0261297 | 3/1988 | European Pat. Off. |
| 2110427 | 6/1983 | United Kingdom |
| 2176445 | 6/1986 | United Kingdom |

Primary Examiner—Howard N. Goldberg
Assistant Examiner—Irene Cuda
Attorney, Agent, or Firm—Pennie & Edmonds

[57] ABSTRACT

In order to facilitate rapid automatic set up and adjustment of a robotic assembly arrangement in a manner which produces the required precision, pre-recorded data and expert system software are teamed together and used to set robotic support jigs and move panels into position against the body they are to be attached to. The position of the panels is determined using a laser scanning technique and feedback control used to adjust the robots and associated hardware and move the panel or panels in the case there is a deviation beyond acceptable tolerances in a manner which either reduces or eliminates the deviation.

4 Claims, 4 Drawing Sheets

VEHICLE ASSEMBLY METHOD AND APPARATUS

BACKGROUND OF THE INVENTION

1. Field of the Invention

The present invention relates generally to a production line arrangement and more specifically to an automated method of assembling automotive vehicles or the like.

2. Description of the Prior Art

A previously proposed production assembly arrangement used support arrangements, each equipped with a number of gauge members on which panels could be supported and clamped in position. By either moving the support arrangement to the structure under assembly such as a partially completed vehicle body, or bringing the structure to the support, the panel could be held in an appropriate position with respect to the structure, thereby facilitating spot welding of the panel to the structure.

However, this arrangement has serious drawbacks. One is that the gauge members each required hydraulic or pneumatically operated latch-like members which could be swung into position to clamp the panel (work piece) against the gauges during the welding or like operation. However, the clamping members were required to be shaped so that when they closed down on the gauge sections the resulting aperture corresponded to the cross-sectional shape of the clamped and supported panel or component. Therefore, the variety of panels and/or components which could be supported by any one support arrangement was severely limited.

Further, due to the rigidity of the panels, when the latch-like members were swung to their released positions, the panels sometimes tended to exhibit a "spring back" phenomenon or the like. As a result the panels sometimes became distorted or changed positions.

To overcome this problem it was found necessary to isolate and manually adjust the positions of the gauges that caused the "spring back" phenomena, so that when the clamping action was removed, the panels would not undergo the undesirable changes in configuration and/or position. However, these adjustments proved to be extremely time consuming and, in combination with the requirement to install and adjust new gauge members each time the line was modified (including the above mentioned type of fine adjustment), was found to badly impair the utility of the arrangement.

To overcome this problem an arrangement of the nature disclosed in JP-A-59-144595 and U.S. Pat. No. 4,691,905 issued on Sept. 8, 1987 in the name of Tamura et al, was proposed. This arrangement features the use of work piece locating devices which include gauge members which can be selectively shaped in accordance with the profile and shape of the work piece to be supported. Using these arrangements in combination with articulated robotic support devices, which permit the gauges to be moved in three dimensions, a number of panels and components can be selectively moved into predetermined positional relation with one another, and spot welded together.

However, this type of arrangement has also met with only partial success. One problem is that considerable time is required to set up the system. For instance, if the robots are provided with a control program it is necessary for an operator to "teach" each robot its procedure during the initial set up stages. This teaching involves manual control of the mechanism so that the operator actually performs the assembly operation. Once the appropriate movements are recorded, the robot is able to mimic the manually induced set of operations and thus reproduce the human activity. Accordingly, when a change in production is required, an operator must re-teach the robots in accordance with the new or modified tasks which are now required. By way of example only, should production be shifted from a sedan model to a station wagon the forward end of the vehicle will remain essentially the same. However, the rear portion will have different panels and require that the robots be taught how to manipulate the same into place and secure the same by welding. Another problem is that once in operation, this method requires constant surveillance and adjustment of the various elements to remedy any drift in their setting and prevent the assembly's accuracy from deviating outside permitted tolerances.

SUMMARY OF THE INVENTION

It is an object of the present invention to provide a system which is essentially totally automated and which can quickly set the assembly arrangement and adjust the same to produce the required precision within a short time and which constantly monitors the assembly to ensure that the required tolerances are met.

In brief, in order to achieve the above object, pre-recorded construction and assembly data together with expert system software are used to set robotic support jigs and move panels into position against the body they are to be attached to. The position of the panels is determined using a laser scanning technique. Feedback control is control used to adjust the robots and associated hardware to move the panel or panels if there is a deviation beyond acceptable tolerances and thereby reduce or eliminate the deviation.

More specifically, a first aspect of the present invention is deemed to comprise an assembly arrangement wherein a plurality of work pieces are to be connected to a body with a given degree of precision, the arrangement features: means for determining the various positions in which said plurality of work pieces should be disposed relative to said body using pre-recorded data which relates to the design of said structure; work support means for supporting and moving said plurality of work pieces into the determined positions relative to said body; means for determining the correct positions of a plurality of reference points defined on each of said plurality of panels, using said pre-recorded structure design data; structure measuring means for determining the actual positions of said plurality of reference points; means for determining the deviation between each of the actual and the correct reference points; a memory bank, said memory bank containing said pre-recorded data and inference means which is used in combination with said pre-recorded data to determine correction values for correcting any deviations which are in excess of predetermined tolerances in a manner which reduces or eliminates the deviations; and means for fixing said work pieces to said body when the deviations between the correct and actual reference points and are within said predetermined tolerances.

A second aspect of the present invention is deemed to comprise a method of assembling a structure wherein a plurality of work pieces are connected to a body with a given degree of precision, the method features the steps of: determining the various positions in which said plurality of work pieces should be disposed relative to said body using pre-recorded data which relates to the design of said structure; using work support means to support and move said plurality of work pieces into the determined positions relative to said body; determining the correct positions of a plurality of reference points defined on each of said plurality of panels, using said pre-recorded data; determining the actual positions of said plurality of reference points using structure measuring means; determining the deviation between each of the actual and the correct reference points; using a memory bank which contains said pre-recorded data and inference means which is used in combination with the pre-recorded data to determine correction values for correcting any deviations which are in excess of predetermined tolerances in a manner which one or reduces and eliminates the deviations; and fixing said work pieces to said body when the deviations between the correct and actual reference points and are within said predetermined tolerances.

A third aspect of the present invention is deemed to comprise an assembly system which features: a work piece support robot, said work piece support robot having a jig with which a work piece can be supported, said jig including a device which can be shaped to assume the configuration of the portion of work piece which is to be engaged by said device, said work piece support robot being arranged to move said work piece into a predetermined relationship with a body to which the work piece is to be connected; a securing robot, said securing robot supporting a securing device via which the work piece can be secured to the body; measuring means for measuring the disposition of said work piece on said body and for producing data from which the disposition can be interpreted; control means responsive to said measuring means for controlling the operation of said work piece support and securing robots, said control means including a memory in which design, assembly and inference data is stored; processing circuity containing means for using said design, assembly and inference data for interpreting the data from said plurality of measuring means and for producing control signals via which said work piece support and securing robots and said measuring means are respectively controlled, said control means being arranged to initially move said robots from their home positions to ones wherein the work piece is supported in a position predetermined to place the work piece in the desired position on said body, induce the measuring means to measure the position of a predetermined reference point on the work piece, compare the actual position of the reference point with that derived from the design data and to determine if there is a deviation between the two points, produce correction values which are used to adjust said work piece support robot in a manner which tends to eliminate said deviation, repeat the comparison and production of correction values until the work piece is located in a position wherein the difference between the actual reference point and the point derived from the design data is within a predetermined tolerance; and induce the securing robot to secure the work piece to said body.

A fourth aspect of the present invention is deemed to comprise a method of assembly which features the steps of: supporting a work piece on a work support robot, said work piece support robot having a jig, said jig including a device which can be shaped to assume the configuration of the portion of work piece which is to be engaged by said device; moving said work piece into a predetermined relationship with a body to which the work piece is to be connected, using a securing robot; measuring the disposition of said work piece on said body and for producing data from which the disposition can be interpreted; controlling the operation of said work piece support robots by way of a control means, said control means including: a memory in which design, assembly and inference data is stored; and processing circuity containing means for using said design, assembly and inference data for interpreting the data from said plurality of measuring means and for producing control signals via which said work piece support and securing robots and said measuring means are respectively controlled, said control means also being arranged to initially move said robots from their home positions to ones wherein the work piece is supported in a position predetermined to place the work piece in the desired position on said body, induce the measuring means to measure the position of a predetermined reference point on the work piece, compare the actual position of the reference point with that derived from the design data and to determine if there is a deviation between the two points, produce correction values which are used to adjust said work piece support robot in a manner which tends to eliminate said deviation; repeat the comparison and production of correction values until the work piece is located in a position wherein the difference between the actual reference point and the point derived from the design data is within a predetermined tolerance; and induce the securing robot to secure the work piece to said body.

DETAILED DESCRIPTION OF THE PREFERRED EMBODIMENTS

Figure 1:
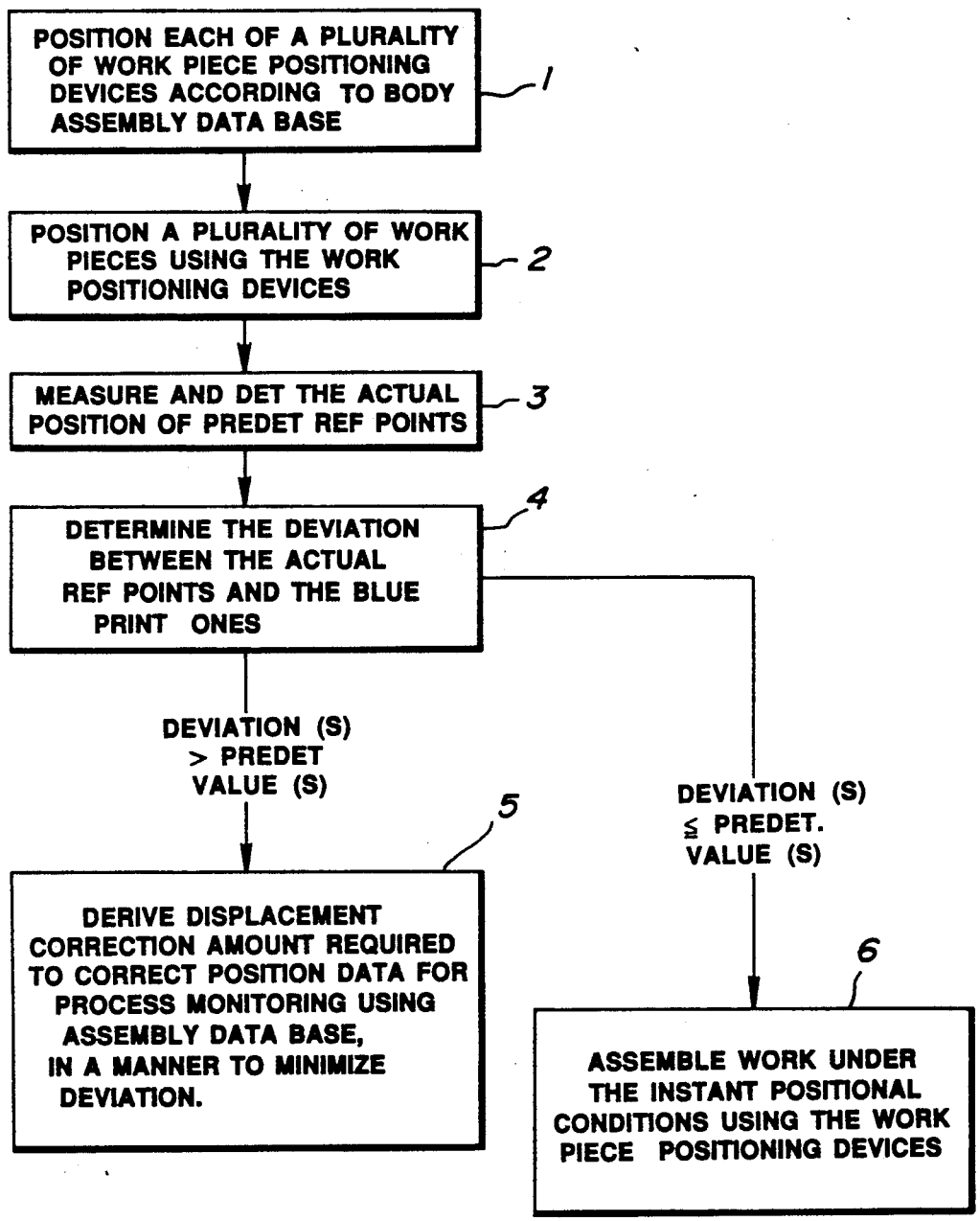
FIG. 1 is a block diagram shown the basic steps which are used in connection with the instant invention.
Figure 2:
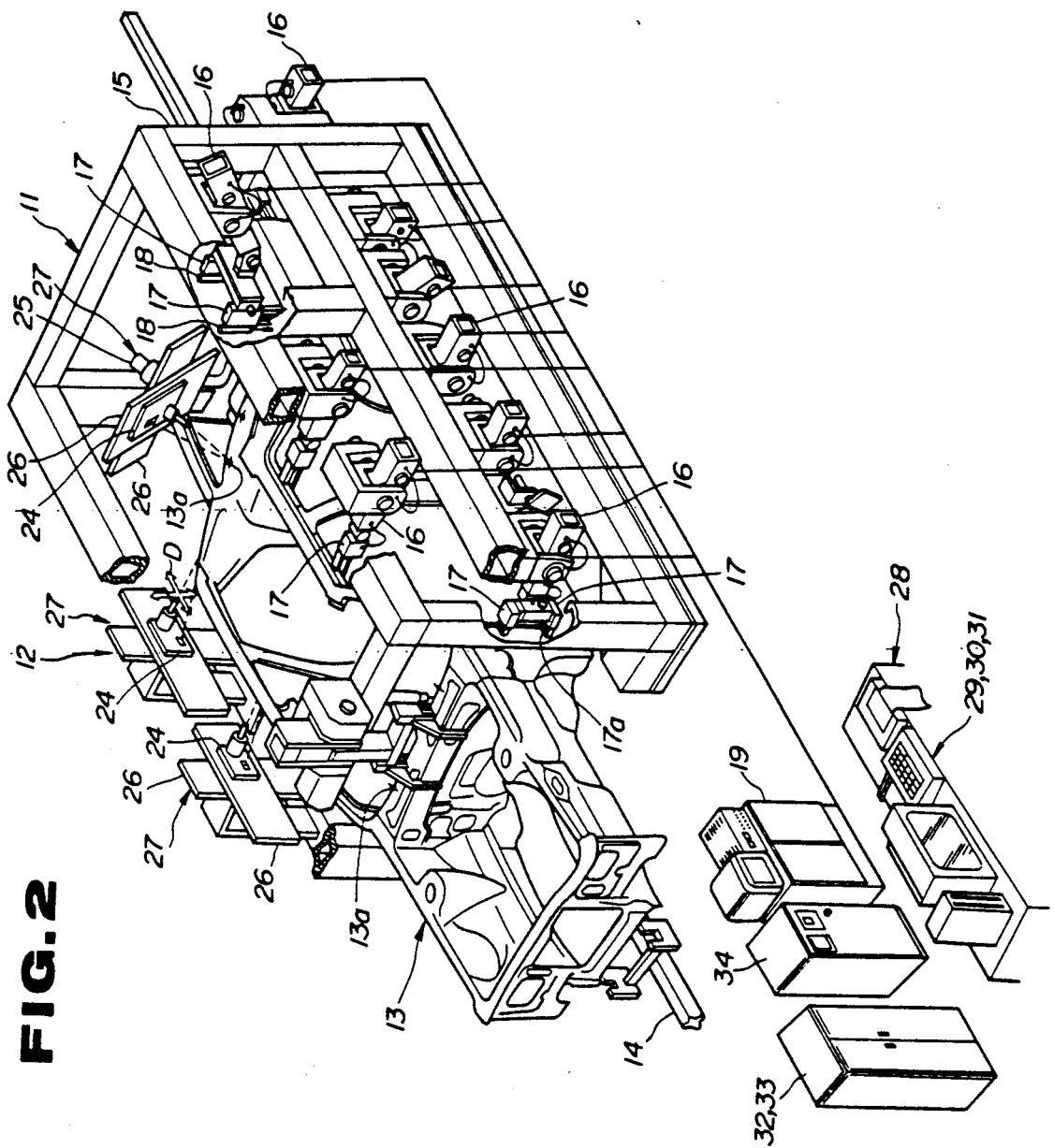
FIG. 2 is a perspective view of an assembly stage wherein a vehicle body is assembled and measured.

FIG. 2 is a perspective view showing a stage of a production line which embodies the present invention and which comprises a work positioning system 11 and a body measuring system 12 constructed within a rectangular framework. The stage illustrated in FIG. 2 performs the assembly of the main body section 13, consisting in the example shown, of the left and right side panels, the rear panel, cowl top assembly and shelf panel. First, the work piece positioning system 11 moves the above mentioned panels into their respective positions relative to the main body component. The body measuring system 12 then determines if the panels are correctly placed and if not, activates feedback control of the work piece positioning system until sufficiently accurate placement is achieved. Spot welding or the like then secures the panels in place.

The vehicle body is then moved along shuttle conveyor 14 to the next stage where the roof rail and roof panel components (by way of example only) are additionally disposed on the vehicle body. Using the same positioning method as the previous stage the roof components are aligned with sufficient accuracy and then welded in place. The assembly is then measured in order to re-check the production precision.

As shown in the FIG. 2 embodiment, frame 15 is arranged to support a plurality of robots 16, which constitute part of the work piece positioning system. The robots 16, each of which has a hand portion and a work supporting jig 17, locate the panels in their respective positions. Selected robots 16 are further provided with pneumatic cylinder operated work clamp devices 18.

The work supporting jigs 17 include gauge devices 17a which are made up of a large number of thin plates. The plates can be individually moved (via vibration or similar mechanical means) in a manner to define a predetermined contour or shape and are then squeezed together and locked in position. In this embodiment the gauge devices 17a are individually set in predetermined shapes depending on both the shape of the particular structural element which they support and the particular operation to be carried out. For further details concerning the construction, arrangement and setting of the gauge devices 17a, reference may be had to U.S. Pat. No. 4,691,905 issued on Sept. 8, 1987 in the name of Tamura et al. The content of the Tamura et al. U.S. Pat. No. 4,691,905 is hereby incorporated by reference herein.

Following the shaping of the gauge devices 17a, the leading ends of the jigs are moved into appropriate positions so that the preshaped gauge devices 17a engage their respective work pieces. Since each gauge device 17a has been pre-shaped to mate with the portion of the work piece which it engages, the work piece can be securely supported and moved to its position for mounting on the main vehicle body 13.

Upon being appropriately located with respect to the main vehicle body or member 13, clamping devices 18 which are provided on selected robots 16 firmly secure the panels to the main vehicle body to establish a somewhat integral arrangement.

Welding robots (not shown) are provided at this stage and induced to perform spot welding to permanently secure the panels in place.

Figure 3:
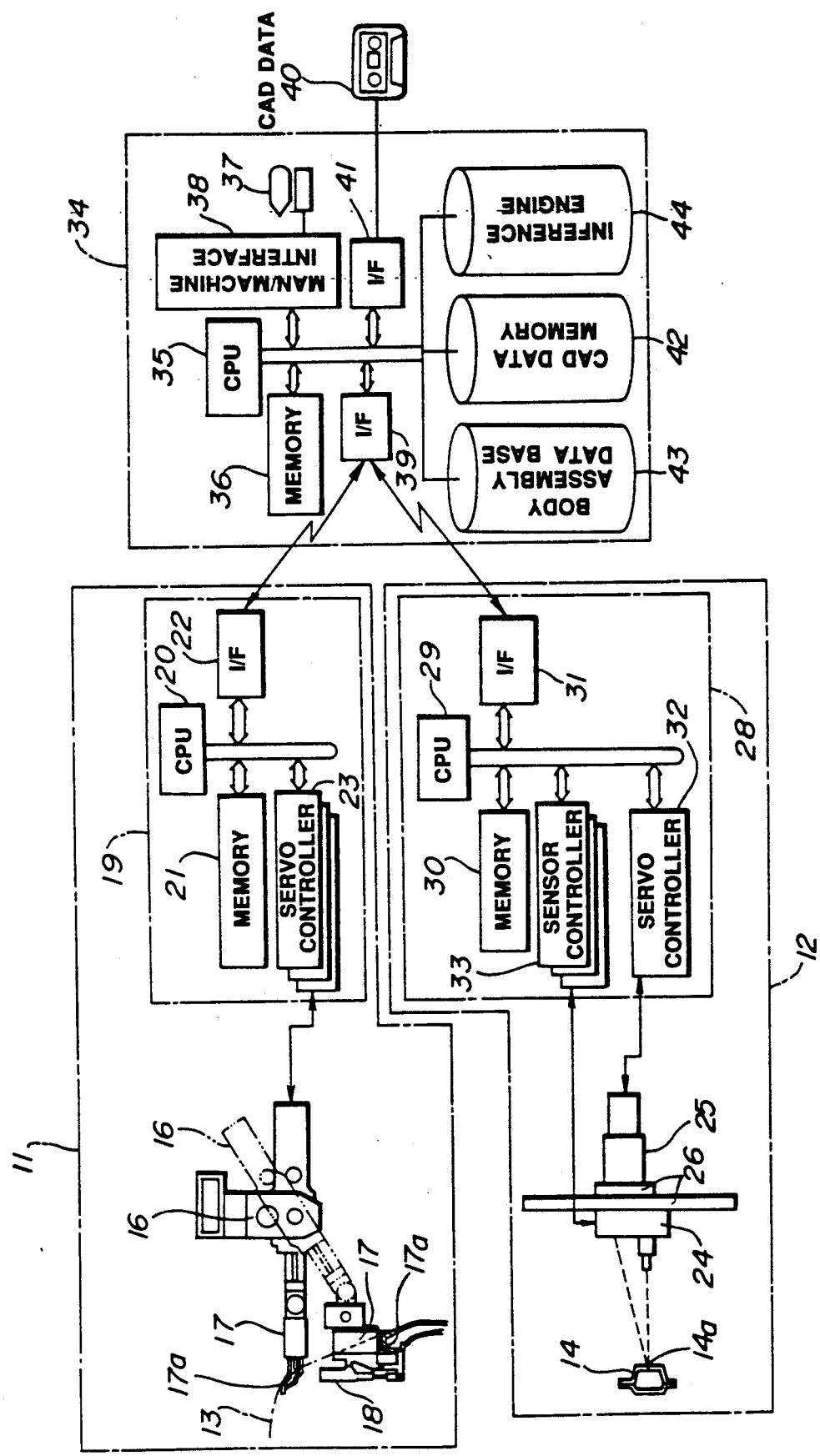
FIG. 3 is a schematic drawing depicting the hardware arrangement which is used in connection with the instant embodiment of the present invention.

In order to control the operations of the above, the hardware arrangement schematically shown in FIG. 3 is used. As will be apparent, this arrangement includes a robot control unit 19 which comprises a CPU 20, a memory 21, an I/O interface 22 and a plurality of servo controller units 23. The memory 21 contains data pertaining to the disposition of the work jigs 17 and the setting of the gauge devices 17a. The CPU 20 is arranged to process the data and to establish a feedback control wherein control and positional data is transferred back and forth between the various elements via a bus arrangement (no numeral). In accordance with the data inputted via the interface 22, the relevant data is read from memory 21 and the appropriate control implemented.

The body measuring system 12 includes a plurality of dimension measuring devices of which three are shown. These devices are each arranged to be movable in the directions indicated by the bold arrows D in FIG. 2. Each dimension measuring device includes a scanner 24 which produces a laser beam and a servo motor 25 one is arranged to move the scanner vertically and horizontally along a guide arrangement 26. During operation, the scanners 24 are induced to produce laser beams which are projected against selected portions of the vehicle body. The positions of the reflected beams are then detected so as to provide data indicative of the dimensions and distances of the scanned portions.

For more disclosure relating to the construction and operation of such devices, reference may be had to copending U.S. patent applications Ser. No. 215,708 filed on July 6, 1988 in the name of Kawamura et al and Ser. No. 215,098 filed on July 5, 1988 in the name of Endo et al.

The first of these documents discloses a dimension measuring system which accurately scans an object for the purposes of determining its dimensions, surface finish or the like, by first determining the orientation of the object relative to the system coordinate grid. Using this orientation, the degree of misalignment with respect to a standard position on the grid is then determined. The scanning devices which perform the actual measurement are then moved into positions which correct for the misalignment and thereby assure accurate examination.

The second document relates to a variable laser power dimension measuring system which accurately measures the panel or structure under observation. The system reduces the laser power when a preselected parameter magnitude of a signal produced in response to a received reflected laser beam is excessively high.

On the other hand when the signal is low and laser power cannot be increased further, amplification is induced until the required level is produced.

The operation of the dimension measuring devices is controlled by a control circuit arrangement or unit 28. This arrangement includes a CPU 29, a memory 30 and a plurality of servo controllers 32 and 33. As shown the servo controllers 32 are connected to the motor and positional control arrangement of the scanners, while the controllers 33 are operatively connected with the scanning mechanisms. An interface 33 is arranged to receive instruction data concerning when and where to scan and to output the resulting dimension indicative data which is obtained.

A central control arrangement 34 includes what is referred to as an expert system. This arrangement, as shown in FIG. 3, comprises a CPU 35, a memory 36, a man/machine interface 38 (in this case including a keyboard and display arrangement 37), an interface 39 which is arranged to transmit data to and receive data from, the interface arrangement 22 of the robot control unit 19 and the interface 31 of control unit 28 which controls the operation of the scanning devices.

The central control unit 34 (as it will be referred to hereinafter) further includes a second interface arrangement 41 which is arranged to receive data input from a source such as a cassete drive containing a streamer tape or the like. In this arrangement the cassete contains CAD data which is recorded on a suitable large capacity memory device 42 which has high speed access, such as a magnetic drum, hard disc or series of hard discs. In addition to the CAD memory, the central control unit further includes a body assembly, data base memory device 43, and what shall be referred to a "logic engine" memory device 44. The latter mentioned memory contains programs which can extrapolate and infer various results from the data available. In other words, the arrangement amount to a kind of artificial intelligence (AI) system.

Figure 4:
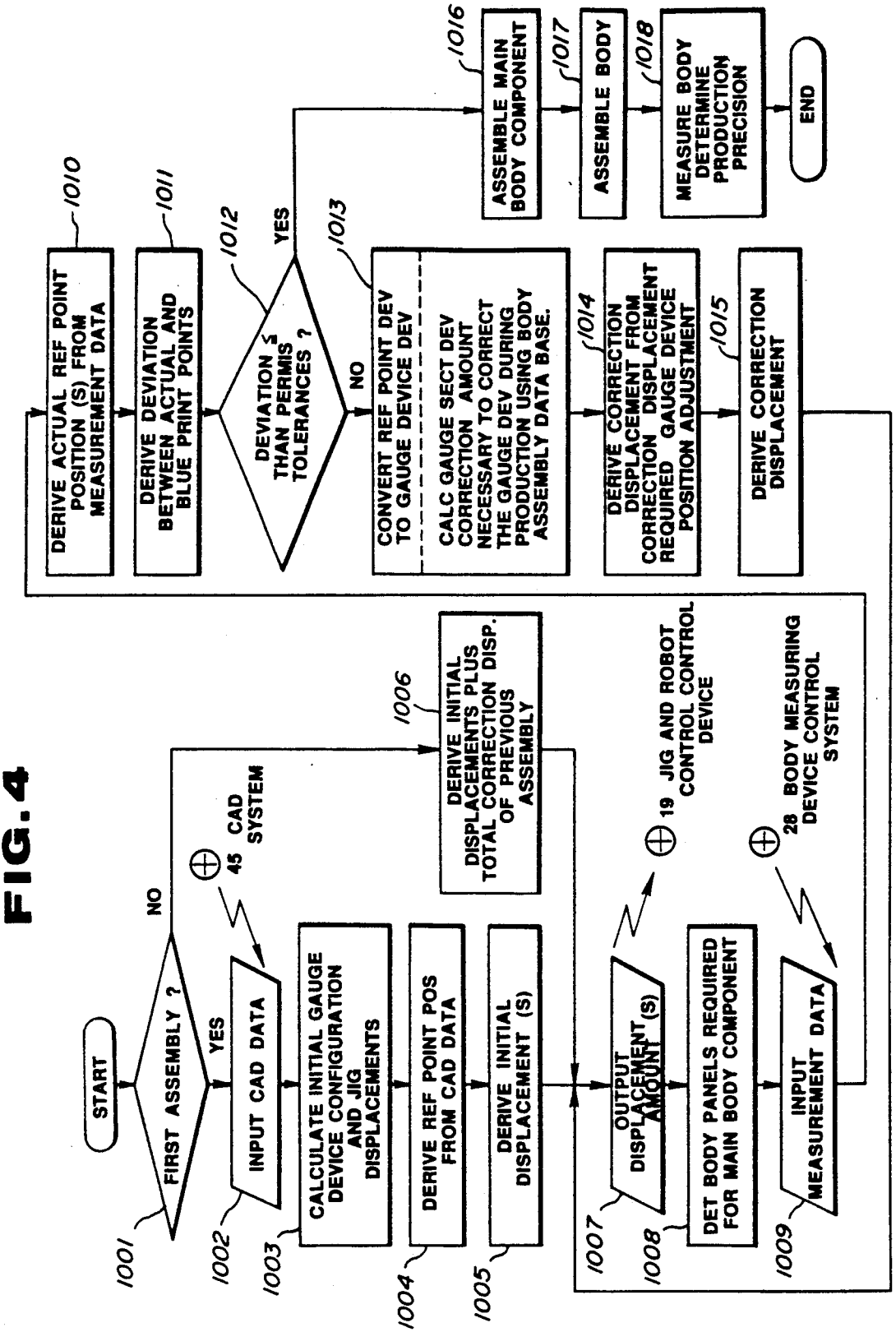
FIG. 4 is a flow chart showing the control steps which characterize the operation of the embodiment of the instant invention.

FIG. 4 shows, in flow chart form, the steps which characterize the operation of the above described system. The first step 1001 of this chart determines if the instant run of the illustrated program is the initial run. In the event that it is the initial run then at step 1002 the CAD data is loaded into the central control unit 34 from the cassette drive or similar data source 40. When the data has been loaded and transferred to the CAD memory device 42, the program then flows to step 1003 wherein, depending on the panels to be attached, the positions of the work piece support units are determined in accordance with the respective gauge devices and input to the central control unit 34. Based on the CAD data, the control unit 34 then develops data which satisfies the required positional relationship between the work piece support units, and calculates the position and displacements for each of the work support jig and gauge devices.

In addition to this, in order to induce the work support jigs 17 to assume the required positions, the amount of initial displacement of the units from their home positions is derived. Together with this, in order to achieve the shape to which each of the gauge devices must be set so as to correspond to the shape of the work piece to be supported thereby, the displacement required for each of the plates of the gauge devices from their respective home positions is derived.

Following this, at step 1004, the location of the reference points on the particular panel to be supported are determined using CAD data. The points, which are used as scanning target to determine the assembly accuracy are then input to the main control unit 34. The main control unit 34 then derives the "blue print" positions at which these reference points should be located after the panels are disposed on the main vehicle body at the instant assembly stage. Viz., the panels are disposed with the required precision, in the positions according to the CAD data defined "blue print" of the vehicle body. Upon completion of this the program flows to the next step.

At step 1005 commands which induce the abovementioned initial displacement of the plates of the gauge devices 17a and of the respective work support jigs 17 are generated. At step 1007 these command signals are transmitted to the jig and robot control units 19 via the interfaces 22 and 39.

On the other hand, in the event that the outcome of the inquiry conducted at step 1001 indicates that the instant run is not the first, then the program by-passes step 1002-1005 and flows directly to step 1006. At this step, the program updates the displacement values which were used in the immediately previous run and adds correction values to the existing ones. The correction values adjust for any deviations beyond an acceptable limit or the like by modifying the various displacement values and therefore modifying the positions in which the various panels are disposed prior to spot welding. As will become more apparent hereinafter, there may be some difficulty in actually getting one or more of the panels to fit into exactly the required position. If that occurs, the robots 16 are suitably induced to try a different technique of moving the panel into positions, in a manner similar to what would happen if a human operator were present.

This modifying process as will become apparent as the disclosure proceeds, of course quickly eliminates any inaccuracies and ensures that the desired assembly precision is quickly established and maintained. The manner in which these correction values are derived will be discussed hereinafter.

Step 1008 is such as to induce the various work piece support jigs 17 to move and set the various panels in place on the main vehicle body. Following this, at stage 1009, the body measuring system 12 is used to scan the various predetermined points on the respective panels and input the data to the central control unit 34. At step 1010, the positions of the reference points are determined and at step 1011 the difference or deviation between each of the actual and corresponding blue print points is derived and subsequently compared in step 1012 with predetermined limits or tolerance values. In the event that each of the points is found to be within permissible limits of the blue print values, the program moves to step 1016. However, if one of the points is not yet within an acceptable range of the desired position, then the program flows to step 1013.

In this latter mentioned step, the amount of deviation of the panel from the preferred location is converted into displacement correction values for the gauge devices 17a associated with the same.

In order to conduct the above mentioned conversion, the data contained in the body assembly data base and what shall be referred to as an "inference engine" is utilized in a manner wherein the position of each of the thin plates used in the gauge sections required to move the panel toward the desired position are derived, subsequently, to reduce or eliminate the sensed deviation, the change in displacement from the instant values are determined. The so called "inference engine" in this instance contains what can be referred to as artificial intelligence type programs which can predict and extrapolate the appropriate displacement corrections in close to real time.

This is necessary in view of the number of different panels which are involved and the large number of different shapes, mutual relationships, displacements and orientations which are required to accurately assemble the same. In other words, in order to permit the maximum possible number of construction operations to be carried out on the main body component, the data base and the inference engine are teamed together in a manner to emulate the skilled worker in a manner to minimize or eliminate the deviations between the assembled body and the blue print version. To this end, the amount of displacement is derived, after taking the structural rigidity of the adjacent panel or panels in question into account, by the use of a finite element and linear programming method. Using this technique the amount of displacement can be converted into suitable gauge section displacement correction values.

More specifically, at step 1013, using the inputted CAD data to derive a model of the main body section as thus far assembled in terms of rigidity distribution etc., of the same, the difference between the actual and the desired constructions are ascertained, the gauge section displacement correction values are read, and using a conversion equation which allows for the rigidity, the positions in which the work support jigs should be disposed are converted with respect to the deviation amount in real time. Following this, the inference engine deduces or infers the cause of the difference and uses the above mentioned difference and gauge section displacement correction amount to obviate the error which induced the deviation.

This correction management process is such that the required gauge section position is obtained based on the relationship of the difference between the actual and desired construction and the gauge section displacement correction.

At step 1014, the gauge section position correction amount data obtained in the previous stage (viz., step 1013) is used to correct the amount of displacement of the work support jig or jigs induced at step 1007. At step 1015 suitable correction displacement commands are generated, and following this, the program loops back to step 1007.

It should be understood that steps 1008 to 1015 are such as to derive the position of the reference points on the various panels and determine the relative displacement or deviation between those points and the "blue print" points derived using the CAD data. Following this the deviation is reduced or eliminated by feedback control which modifies the gauge section displacements by deriving a displacement correction. The process is repeated until such time as required assembly tolerances are met, whereafter the program proceeds to step at step 1016 spot welding is carried out and the various panels which have been disposed in position are permanently secured therein. At step 1017 the thus far assembled vehicle body is moved along the shuttle conveyor 14 to the next stage whereat, as previously mentioned, further panel disposition and spot welding operations are carried out.

At step 1018 the work performed in the previous stages is checked by measuring and/or inspecting the vehicle body using laser beam scanning equipment of the nature disclosed in the above mentioned copending U.S. patent applications (viz., copending U.S. patent applications Ser. No. 215,708 filed on July 6, 1988 in the name of Kawamura et al and Ser. No. 215,098 filed on July 5, 1988 in the name of Endo et al.

As a result of the above described method, the assembly accuracy is carefully checked. As will be appreciated, the use of the above described method ensures that the various panels will be placed on the main body section with the required degree of accuracy, and that the various settings and displacement which effect the location of the panels are corrected by feedback control to the point that the required tolerances can be met. The time required for the correction and adjustment is minimized, since the cycle by which correction is implemented is such that a large number or jigs and gauges can be adjusted much faster than with the prior art arrangements. Moreover, the use of the method also facilitates quick production set up and initiation.

It should be noted that in this instance the inference engine is arranged so that, in the event that the above method of reducing the difference between the actual and desired location of the reference points does not prove effective, the system is able to select another difference reducing program. In such an event the system would preferably select the next most appropriate method from the number of possible different ones which have been programmed.

Although this invention has been described with reference to an example operation of a particular embodiment, it will be understood in particular, that the present invention is not limited only to the assembly of the above mentioned number of panels to the chassis or main body section. Moreover, it is within the scope of the present invention to dispose/assemble a relatively large number of different panels and/or components at the same stage/event and thereby perform and complete the construction of the vehicle using a single stage, rather than using a series of different stages, if so desired.

What is claimed is:

1. An assembly arrangement wherein a plurality of work pieces are to be connected with a given degree of precision to a structure, comprising:
    means for determining a position in which each of said plurality of work pieces should be connected relative to said structure using pre-recorded data which relates to the design of said structure;
    work support means for supporting and moving each of said plurality of work pieces into its determined position relative to said structure;
    means for determining a correct position for each of a plurality of reference points defined on each of said plurality of work pieces using said pre-recorded structure design data;
    structure measuring means for determining an actual position for each among said plurality of reference points;
    means for determining the deviation between the actual position and the correct position for each of said reference points while each of said work pieces are supported in situ;
    a memory bank, said memory bank containing said pre-recorded data and an inference means, wherein said inference means is used in combination with said pre-recorded data to determine correction values for correcting any deviations which are in excess of predetermined tolerances in a manner which reduces or eliminates the deviations; and
    means for fixing said work pieces to said body when the deviations between the correct and actual reference points are within said predetermined tolerances.

2. In a method of assembling a structure wherein a plurality of work pieces are connected with a given degree of precision, to a structure the steps of;
    determining a position in which said plurality of work pieces should be disposed relative to a body forming part of said structure using pre-recorded data which related to the design of said structure;
    using work support means to support and move said plurality of work pieces into the determined positions relative to said body;
    determining a correct position for each of a plurality of reference points defined on each of said plurality of work pieces, using said pre-recorded data;
    determining an actual position for each of said plurality of reference points using structure measuring means;
    determining the deviation between each of the actual positions and the correct positions of each of said reference points after each of said work pieces have been moved into said determined position;
    using a memory bank which contains said pre-recorded moved into said determined positions;
    using a memory bank which contains said pre-recorded data and an inference means wherein said inference means is used in combination with the pre-recorded data to determine correction values for correcting any deviations which are in excess of predetermined tolerances in a manner which reduces or eliminates the differences; and
    fixing said work pieces to said body when the deviations between the correct and actual reference points are within said predetermined tolerances.

3. An assembly system comprising: a work support robot having a jig with which a work piece can be supported, a jig including a device which can be shaped to assume the configuration of a portion of said work piece, said portion to be engaged by said device, said work piece support robot being arranged to move said work piece into a predetermined relationship with a body to which the work piece is to be connected;

a securing robot, said securing robot supporting a securing device via which the work piece can be secured to the body;

measuring means for measuring the disposition of said work piece on said body and for producing data from which the disposition can be interpreted;

control means responsive to said measuring means for controlling the operation of said work piece supporting robots, said control means including;

a memory in which design, assembly and inference data is stored;

processing circuitry containing means for using said design, assembly and inference data for interpreting the data from said measuring means and for producing control signals via which said work piece support and securing robots and said measuring means are respectively controlled, said control means being arranged to:

initially move said work support robot from its home positions to one wherein the work piece is supported in a position predetermined to place the work piece in the desired position on said body, induce the measuring means to measure the position of a predetermined reference point on the work piece, compare the actual position of the reference point with that derived from the design data and determine if there is a deviation between the two positions, produce correction values which are used to adjust said work piece support robot in manner which tends to eliminate the deviation, repeat the comparison and production of a correction value until the work piece is located in a position wherein the difference between the actual position of the reference point and the position of the reference point and the position of the point derived from the design data is within a predetermined tolerance; and induce the securing robot to secure the work piece to said body.

4. A method of assembly comprising:

supporting a work piece on a support robot, said work piece robot having a jig, said jig including a device which can be shaped to assume the configuration of a portion of said work piece, said portion to be engaged by said device;

moving said work piece into a position which has a predetermined relationship with a body to which the work piece is to be connected, using a securing robot;

measuring the position of said work piece while the work piece is supported in situ on said body and producing data by which said position can be interpreted; is stored; and processing circuitry containing means for using said design, assembly and inference data for interpreting the data from said plurality of measuring means and for producing control signals via which said work piece support robot and securing robot and said measuring means are respectively controlled, said control means being arranged to:

initially move said supporting robot from its home position to one wherein the work piece is supported in a position predetermined to place the work piece in the desired position on said body;

induce the measuring means to measure the position of a predetermined reference point on the work piece;

compare the actual position of the reference point with that derived from the design data and to determine if there is a deviation between the two positions;

produce correction values which are used to adjust said work piece support robot in a manner which tends to eliminate said deviation;

repeat the comparison and production of a correction value until the work piece is located in a position wherein the difference between the position of the actual reference point and the position of the point derived from the design data is within the predetermined tolerance; and induce the securing robot to secure the work piece to said body.

* * * * *